(12) United States Patent
Ahn et al.

(10) Patent No.: US 12,388,120 B2
(45) Date of Patent: Aug. 12, 2025

(54) BATTERY PACK

(71) Applicant: Samsung SDI Co., Ltd., Yongin-si (KR)

(72) Inventors: Jaepil Ahn, Yongin-si (KR); Younghwan Kwon, Yongin-si (KR); Kisuk Son, Yongin-si (KR); Chuljung Yun, Yongin-si (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 0 days.

(21) Appl. No.: 17/225,822

(22) Filed: Apr. 8, 2021

(65) Prior Publication Data

US 2021/0320338 A1 Oct. 14, 2021

(30) Foreign Application Priority Data

Apr. 14, 2020 (KR) .................. 10-2020-0045238

(51) Int. Cl.
 *H01M 10/42* (2006.01)
 *H01M 10/48* (2006.01)
 *H01M 50/204* (2021.01)

(52) U.S. Cl.
 CPC ..... *H01M 10/4257* (2013.01); *H01M 10/482* (2013.01); *H01M 10/486* (2013.01); *H01M 50/204* (2021.01); *H01M 2010/4278* (2013.01)

(58) Field of Classification Search
 CPC ............. H01M 10/425; H01M 10/482; H01M 10/486; H01M 10/4257; H01M 10/4285;
 (Continued)

(56) References Cited

U.S. PATENT DOCUMENTS 5,607,789 A * 3/1997 Treger ................ H01M 50/121
  429/93
6,379,837 B1 4/2002 Takahashi et al.
(Continued)

FOREIGN PATENT DOCUMENTS

CN 101938016 A 1/2011
CN 105551984 5/2016
(Continued)

OTHER PUBLICATIONS

Shannon, Geoff, and Hong Chen. "Laser welding of aluminum and copper for battery welding applications using a 500W single mode fiber laser." International Congress on Applications of Lasers & Electro-Optics. vol. 2009. No. 1. Laser Institute of America, 2009 (Year: 2009).*

(Continued)

*Primary Examiner* — Matthew T Martin
*Assistant Examiner* — Jared Hansen
(74) *Attorney, Agent, or Firm* — Knobbe, Martens, Olson & Bear, LLP

(57) ABSTRACT

This application relates to a battery pack. In one aspect, the battery pack includes at least one battery cell, a heat transfer piece arranged on the battery cell at a position spaced apart from a charge-discharge path, and a circuit board including a lead portion coupled to the heat transfer piece and a main body connected to the lead portion. The circuit board is configured to acquire temperature information from the at least one battery cell. The battery pack further includes a temperature sensor arranged on the lead portion, a moisture-proof layer provided on the temperature sensor and configured to block penetration of external substances onto the temperature sensor, and an anti-shock layer provided on the moisture-proof layer and configured to absorb external shock. The battery pack is configured to accurately detect (Continued)

the temperature of the at least one battery cell and has a temperature sensing structure improved for reliably protecting the temperature sensor.

20 Claims, 8 Drawing Sheets

(58) Field of Classification Search
CPC .. H01M 50/24; H01M 50/204; H01M 50/209; H01M 50/325; H01M 50/507; H01M 2010/4278; Y02E 60/10
See application file for complete search history.

(56) References Cited

U.S. PATENT DOCUMENTS

| | | | |
|---|---|---|---|
| 9,269,946 | B2 | 2/2016 | Lee |
| 9,293,793 | B2 | 3/2016 | Park et al. |
| 9,515,356 | B2 | 12/2016 | Zeng et al. |
| 9,608,298 | B2 | 3/2017 | Jeong et al. |
| 10,205,196 | B2 | 2/2019 | Byun |
| 10,644,292 | B2 | 5/2020 | Takase et al. |
| 10,704,961 | B2 | 7/2020 | Wang et al. |
| 11,127,990 | B2 | 9/2021 | Hammerschmied et al. |
| 11,128,021 | B2 | 9/2021 | Son et al. |
| 11,223,076 | B2 | 1/2022 | Jeong et al. |
| 2006/0051660 | A1 | 3/2006 | Chang et al. |
| 2006/0214632 | A1 | 9/2006 | Lee et al. |
| 2008/0233470 | A1* | 9/2008 | Zhu .............. F28D 15/0266 165/104.28 |
| 2010/0098974 | A1* | 4/2010 | Kim ................. H01M 50/15 361/103 |
| 2010/0258538 | A1* | 10/2010 | Suzuki ............... B23K 26/02 219/121.14 |
| 2012/0015217 | A1* | 1/2012 | Lee ................. H01M 10/425 429/7 |
| 2012/0177960 | A1* | 7/2012 | Tasai .............. H01M 10/6568 361/535 |
| 2012/0244398 | A1 | 9/2012 | Youngs et al. |
| 2012/0244400 | A1* | 9/2012 | Youngs ........... H01M 10/625 429/82 |
| 2016/0204481 | A1* | 7/2016 | Ryu ................. H02J 7/00309 429/7 |
| 2016/0218347 | A1 | 7/2016 | Baek et al. |
| 2018/0034115 | A1* | 2/2018 | Li ......................... G01K 1/16 |
| 2018/0205055 | A1* | 7/2018 | Hilligoss .......... H01M 10/443 |
| 2018/0331399 | A1 | 11/2018 | Shimizu |
| 2019/0001838 | A1* | 1/2019 | Choi ............... H01M 50/569 |
| 2020/0014083 | A1* | 1/2020 | Matsushima .......... G01K 1/14 |
| 2021/0328279 | A1* | 10/2021 | Jeong ............. H01M 10/482 |

FOREIGN PATENT DOCUMENTS

| | | | | |
|---|---|---|---|---|
| CN | 105826627 | A | | 8/2016 |
| CN | 105938892 | A | | 9/2016 |
| CN | 205861226 | U | | 1/2017 |
| CN | 206758615 | U | | 12/2017 |
| CN | 208128637 | U | | 11/2018 |
| CN | 109891661 | A | | 6/2019 |
| CN | 209492491 | U | | 10/2019 |
| CN | 210221325 | U | | 3/2020 |
| JP | 2002-296120 | A | | 10/2002 |
| JP | 2013-105571 | A | | 5/2013 |
| JP | 2013-137233 | A | | 7/2013 |
| JP | 6507056 | B2 | | 4/2019 |
| KR | 10-0729106 | B | | 6/2007 |
| KR | 10-1219253 | | | 1/2013 |
| KR | 10-1261769 | B1 | | 5/2013 |
| KR | 10-1537457 | B1 | | 7/2015 |
| KR | 20160058635 | A | * | 5/2016 |
| KR | 10-1708365 | | | 2/2017 |
| KR | 10-1841520 | B | | 3/2018 |
| KR | 20180038253 | A | * | 4/2018 |
| KR | 2018-0075551 | A | | 7/2018 |
| KR | 20180088197 | A | * | 8/2018 |
| KR | 10-2019-0069129 | | | 6/2019 |
| WO | WO-2018080033 | A1 | * | 5/2018 ............ H01M 10/04 |
| WO | WO 18/139738 | | | 8/2018 |

OTHER PUBLICATIONS

Hussain, Abid, Chi Yan Tso, and Christopher YH Chao. "Experimental investigation of a passive thermal management system for high-powered lithium ion batteries using nickel foam-paraffin composite." Energy 115 (2016): 209-218 (Year: 2016).*
Takahashi, Takehiro, Kiyokazu Ishizuka, and Koji Kawanishi. "Properties of Nickel-Coated Steel Sheets for Battery Case." Nippon Steel & Sumitomo Metal Technical Report 108 (2015) (Year: 2015).*
WO2018080033A1, Hammerschmied, et al., "Battery module having fixing structure for temperature sensor", machine English translation retrieved from https://worldwide.espacenet.com/ Date: Oct. 3, 2023 (Year: 2018).*
KR20160058635A, Hwang, et al., "Secondary battery and a secondary battery module including the same", machine English translation retrieved from https://worldwide.espacenet.com/ Date: Dec. 26, 2024 (Year: 2016).*
Extended European search report dated Sep. 13, 2021 in corresponding European patent application No. 21168335.4, 8 pp.
First Office Action dated Nov. 8, 2022 in corresponding Chinese patent application No. 202110400928.9, 32 pp.
Second office action dated Apr. 13, 2023 in corresponding Chinese patent application No. 202110400928.9, 29 pp.
Opinion Submission Notice dated Jun. 7, 2023 in corresponding Korean patent application No. 10-2020-0045238, 14 pp.

* cited by examiner

BATTERY PACK

CROSS-REFERENCE TO RELATED APPLICATION

This application is based on and claims priority under 35 U.S.C. § 119 to Korean Patent Application No. 10-2020-0045238, filed on Apr. 14, 2020, in the Korean Intellectual Property Office, the disclosure of which is incorporated by reference herein in its entirety.

BACKGROUND

1. Field

One or more embodiments relate to a battery pack.

2. Description of Related Technology

In general, secondary batteries refer to batteries that can be repeatedly charged and recharged unlike non-rechargeable primary batteries. Secondary batteries are used as energy sources of devices such as mobile devices, electric vehicles, hybrid electric vehicles, electric bicycles, and uninterruptible power supplies. Single-cell secondary batteries or multi-cell secondary batteries (battery packs) each including a plurality of cells connected to each other as a unit are used according to the types of devices that employ secondary batteries.

Small mobile devices such as cellular phones may be operated for a predetermined time using single-cell secondary batteries. However, battery packs having high-output, high-capacity features may be suitable for devices having long operating times and consuming large amounts of power such as electric vehicles and hybrid electric vehicles. The output voltages or currents of battery packs may be increased by adjusting the number of battery cells included in the battery packs.

SUMMARY

One or more embodiments include a battery pack which is configured to accurately detect the temperature of a battery cell and has a temperature sensing structure improved for reliably protecting a temperature sensor.

Additional aspects will be set forth in part in the description which follows and, in part, will be apparent from the description, or may be learned by practice of the presented embodiments of the disclosure.

According to one or more embodiments, a battery pack includes: at least one battery cell; a heat transfer piece arranged on the battery cell at a position spaced apparat from a charge-discharge path; a circuit board including a lead portion coupled to the heat transfer piece and a main body connected to the lead portion, the circuit board being configured to acquire temperature information from the at least one battery cell; a temperature sensor arranged on the lead portion; a moisture-proof layer provided on the temperature sensor and configured to block penetration of external substances onto the temperature sensor; and an anti-shock layer provided on the moisture-proof layer and configured to absorb external shock.

For example, the heat transfer piece may be arranged on a surface forming a case of the at least one battery cell.

For example, the heat transfer piece may be arranged on an electrode surface among surfaces forming the case of the at least one battery cell, and wherein an electrode may be provided on the electrode surface.

For example, the heat transfer piece may be arranged on the electrode surface at a position spared apart from the electrode.

For example, the circuit board may be arranged to face the electrode surface of the at least one battery cell.

For example, the circuit board may include a flexible circuit board, the flexible circuit board including a conductive pattern which is connected to the temperature sensor and an insulating film which insulates the conductive pattern.

For example, the heat transfer piece may include a first coupling portion coupled to the at least one battery cell and a second coupling portion coupled to the lead portion of the circuit board, and the first and second coupling portions may be provided at positions that do not overlap each other.

For example, the at least one battery cell may include a plurality of battery cells arranged in a first direction, and the first and second coupling portions may be arranged in a second direction crossing the first direction.

For example, the heat transfer piece and the lead portion may be sequentially arranged on the at least one battery cell.

For example, the first coupling portion may include a weld zone between the heat transfer piece and the at least one battery cell, and the second coupling portion may include a solder zone between the heat transfer piece and the lead portion of the circuit board.

For example, the heat transfer piece may include a metal plate including nickel or a nickel alloy.

For example, the lead portion may have a surface facing the at least one battery cell and a surface opposite the battery cell, and wherein the temperature sensor may be arranged on the surface opposite the battery cell.

For example, the heat transfer piece, the lead portion, and the temperature sensor may be sequentially arranged on the at least one battery cell, and the temperature sensor is configured to sense a temperature of the battery cell through the heat transfer piece and the lead portion.

For example, the lead portion may include an end connected to the main body of the circuit board, another end connected to the heat transfer piece, and a bent portion between the ends.

For example, the at least one battery cell may include a plurality of battery cells arranged in a first direction, and the bent portion may be bent such that at least portions of the bent portion overlap each other in a second direction crossing the first direction so as to impart flexibility to the lead portion in the first direction between the heat transfer piece and the main body.

For example, the moisture-proof layer and the anti-shock layer may surround the temperature sensor at a side opposite the at least one battery cell.

For example, the moisture-proof layer and the anti-shock layer respectively may include a relatively hard material and a relatively soft material.

For example, a discontinuous interface between different materials may be formed between the moisture-proof layer and the anti-shock layer.

For example, the moisture-proof layer and the anti-shock layer may be respectively provided at an inner position relatively close to the temperature sensor and an outer position relatively distant from the temperature sensor.

For example, the at least one battery cell may include a plurality of battery cells arranged in a first direction, and openings may be formed in portions of the main body of the circuit board and may be arranged in the first direction so as not to block vent holes of the plurality of battery cells, and other portions of the main body may be formed as two branches so as not to block the vent holes of the plurality of battery cells.

BRIEF DESCRIPTION OF THE DRAWINGS

The above and other aspects, features, and advantages of certain embodiments of the disclosure will be more apparent from the following description taken in conjunction with the accompanying drawings.

DETAILED DESCRIPTION

Figure 1:
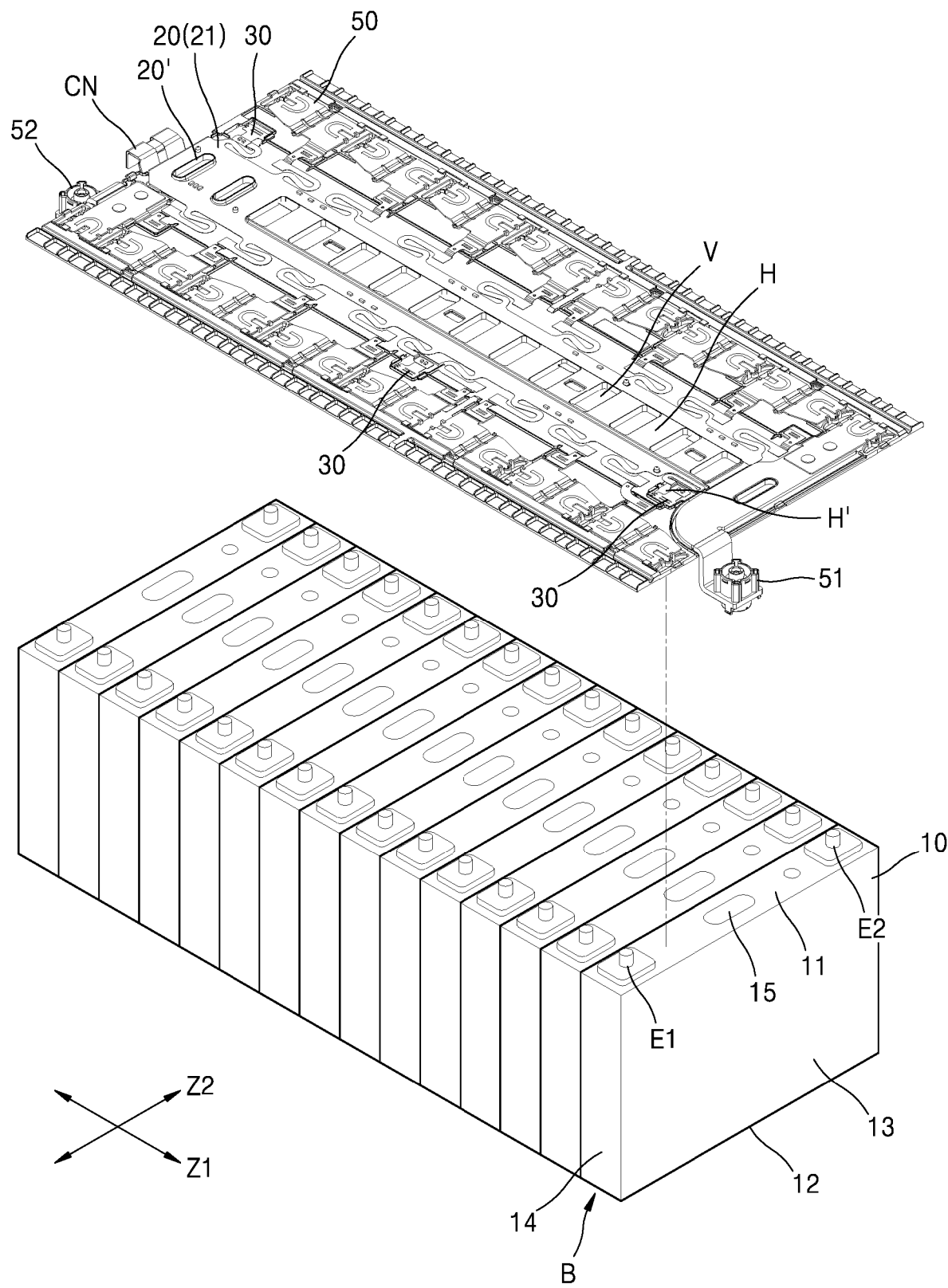
FIG. 1 is an exploded perspective view illustrating a battery pack according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Hereinafter, a battery pack will be described according to embodiments with reference to the accompanying drawings.

Figure 2:
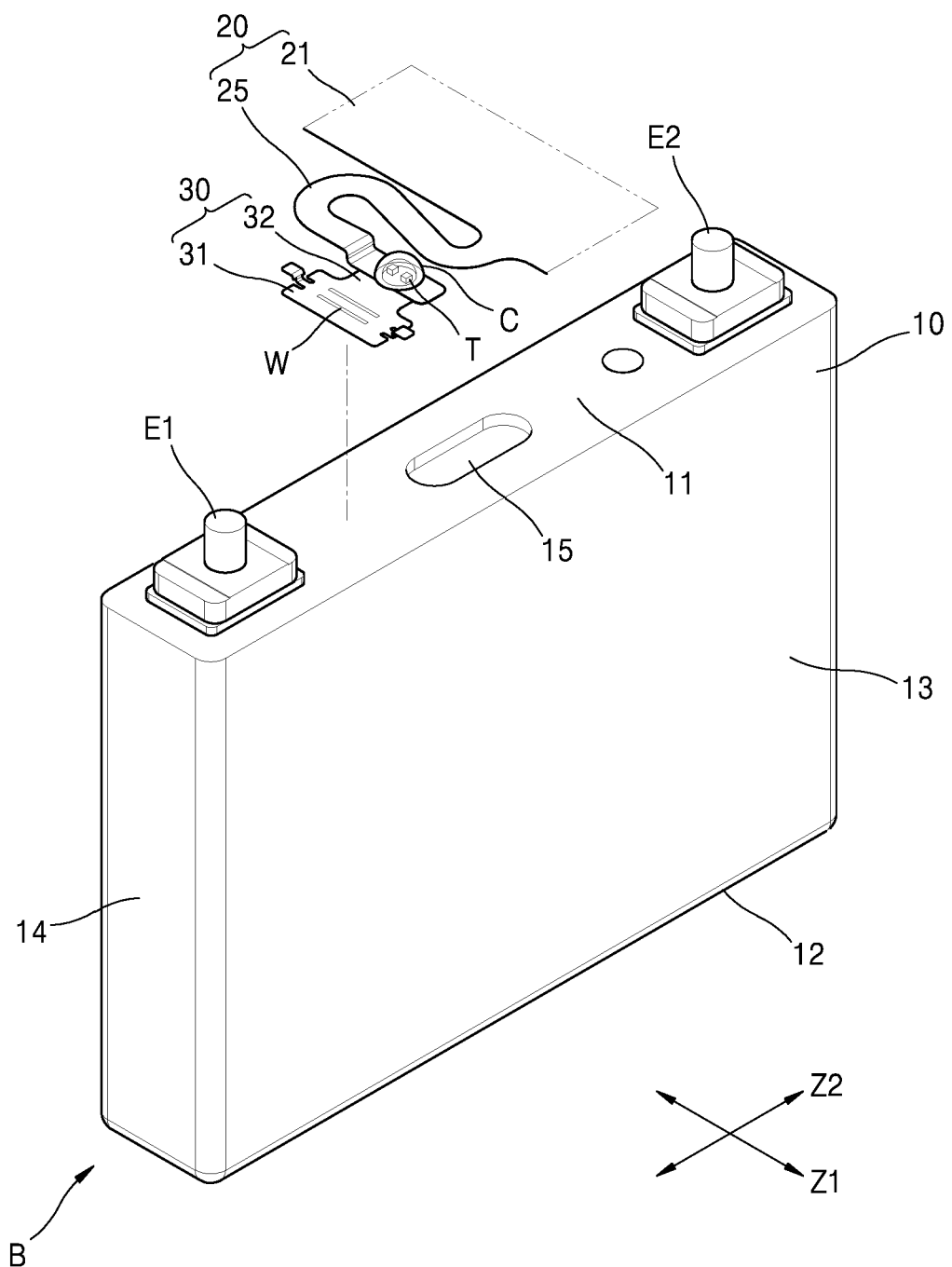
FIG. 2 is an exploded perspective view illustrating a portion of the battery pack shown in FIG. 1.
Figure 3:
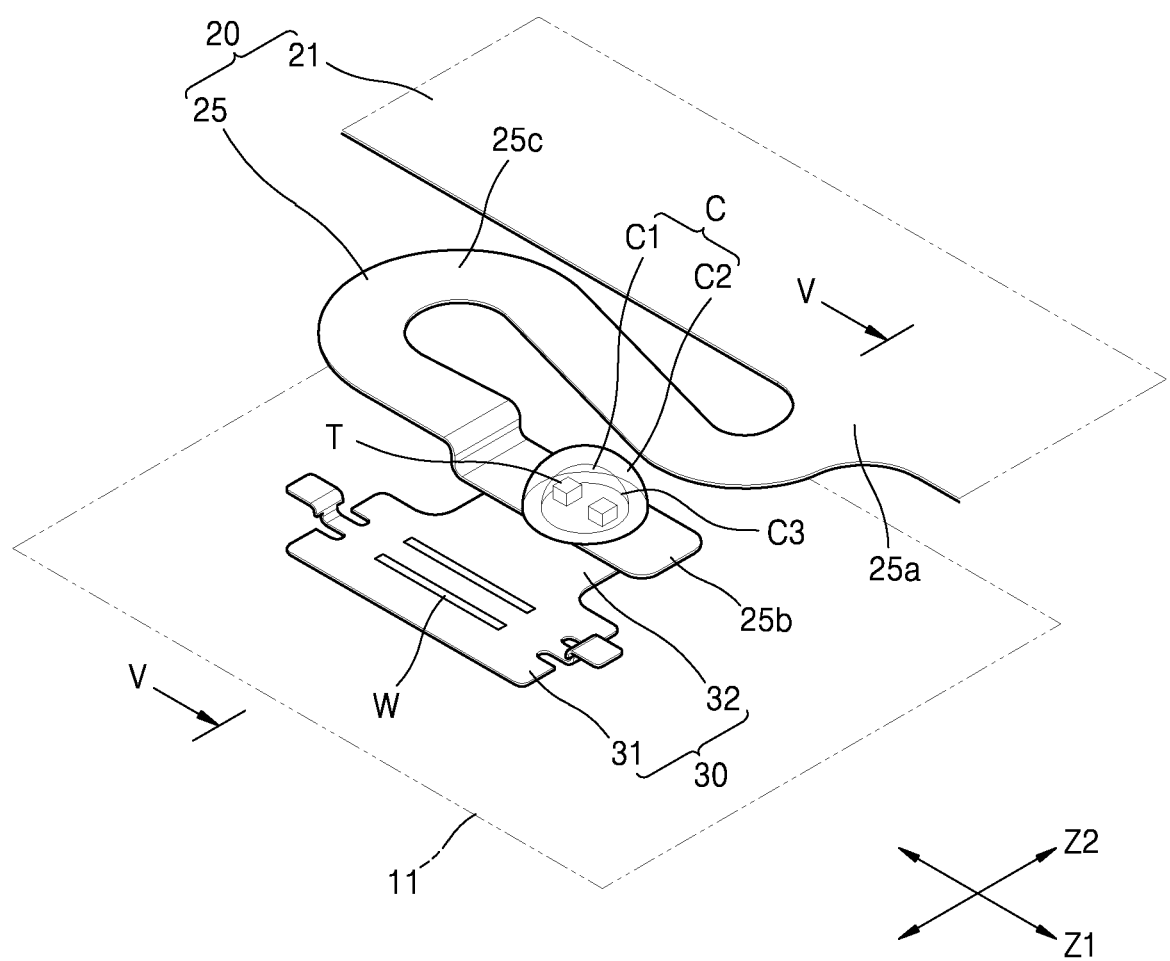
FIG. 3 is an enlarged perspective view illustrating a portion of the battery pack shown in FIG. 2.
Figure 4:
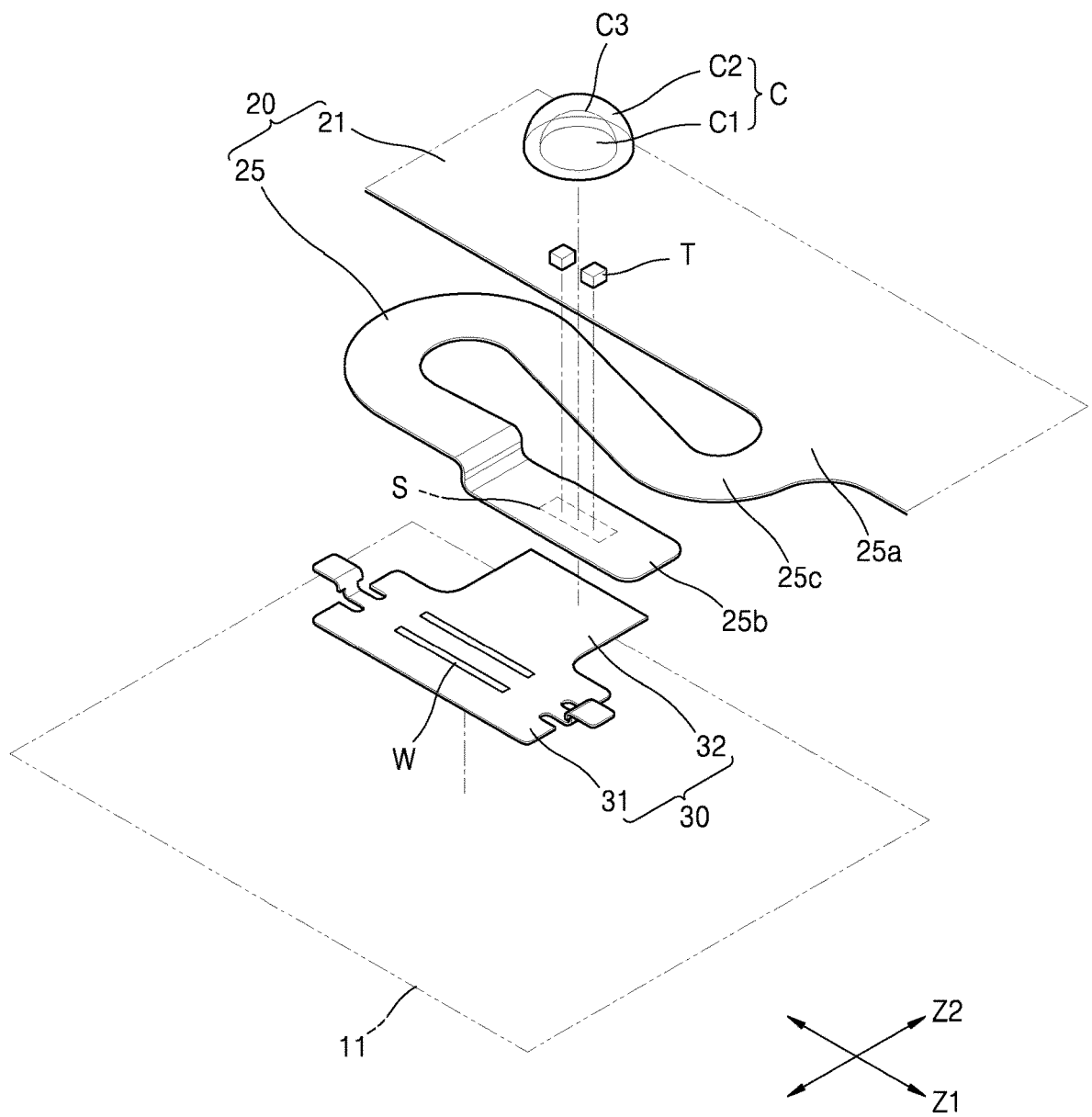
FIG. 4 is an exploded perspective view illustrating the portion of the battery pack shown in FIG. 3.
Figure 5:
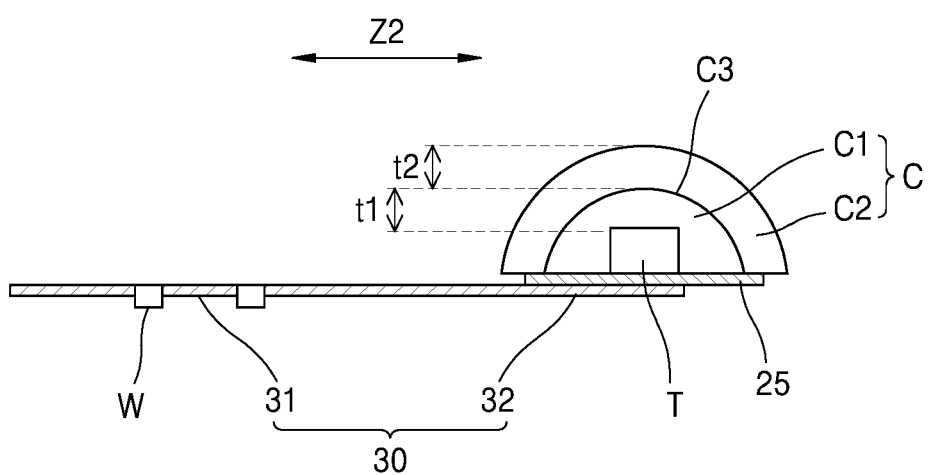
FIG. 5 is a cross-sectional view taken along line V-V in FIG. 3.
Figure 6A:
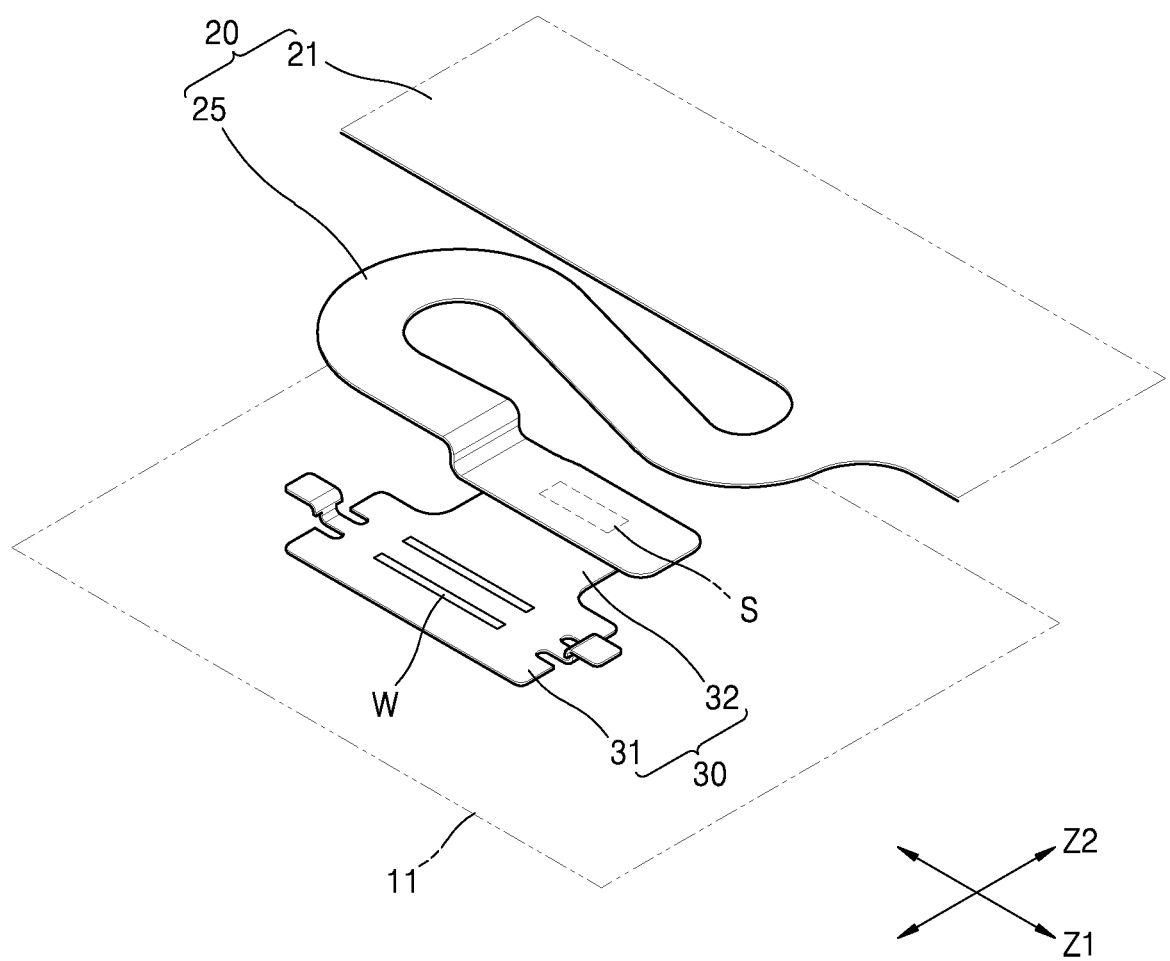
FIGS. 6A, 6B and 6C are perspective views sequentially illustrating processes of forming the battery pack according to an embodiment.
Figure 6B:
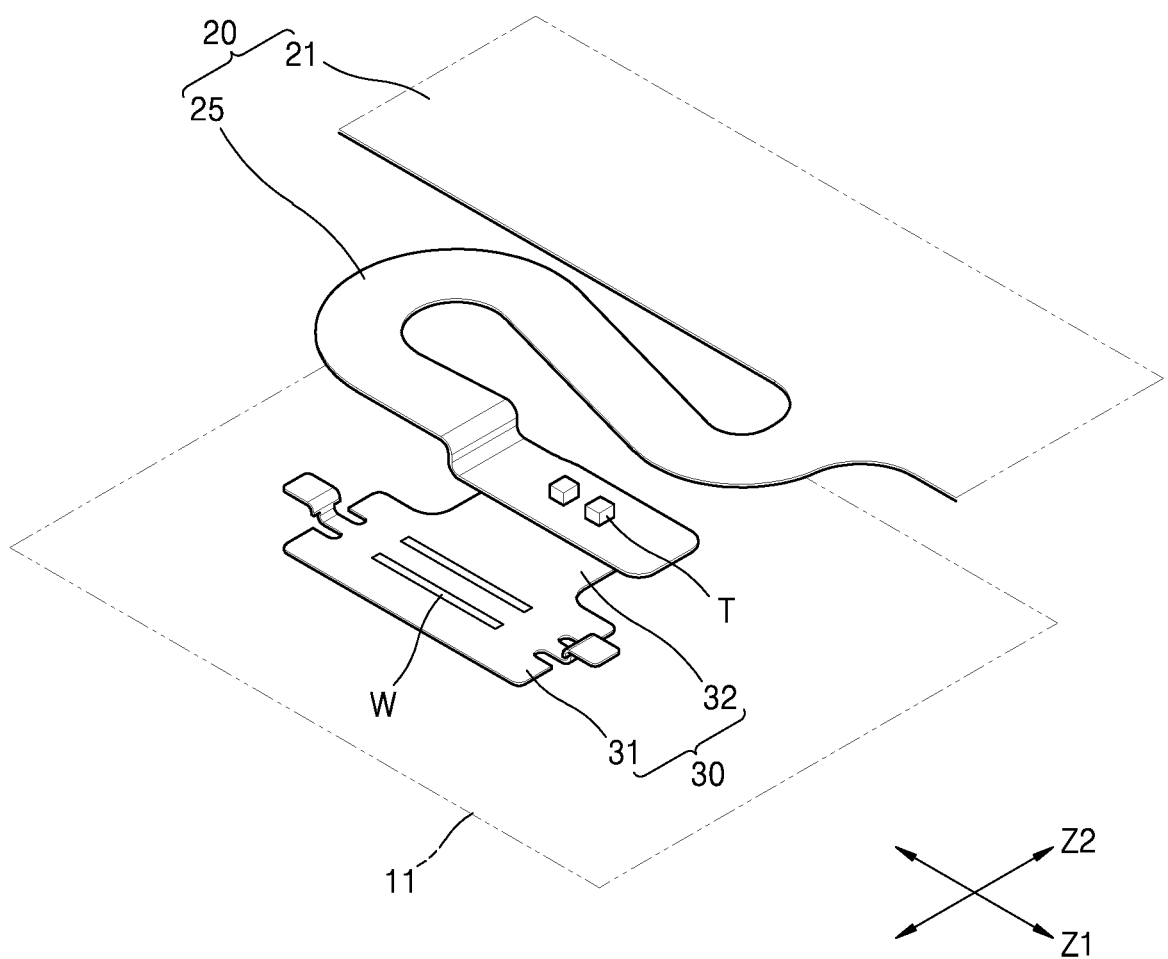
Figure 6C:
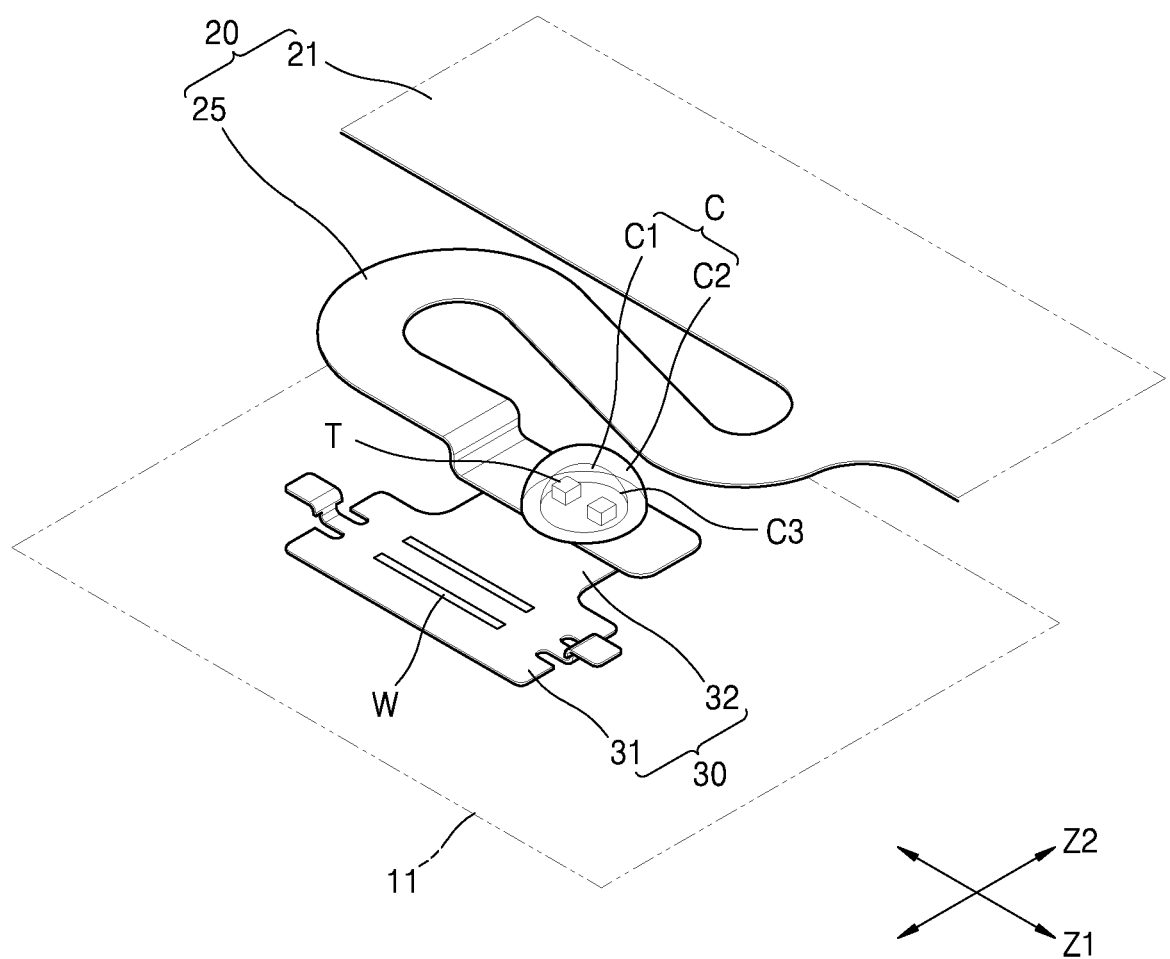

FIG. 1 is an exploded perspective view illustrating a battery pack according to an embodiment. FIG. 2 is an exploded perspective view illustrating a portion of the battery pack shown in FIG. 1. FIG. 3 is an enlarged perspective view illustrating a portion of the battery pack shown in FIG. 2. FIG. 4 is an exploded perspective view illustrating the portion of the battery pack shown in FIG. 3. FIG. 5 is a cross-sectional view taken along line V-V in FIG. 3. FIGS. 6A, 6B and 6C are perspective views sequentially illustrating processes of forming the battery pack according to an embodiment.

Referring to FIGS. 1 to 5, according to an embodiment, the battery pack may include at least one battery cell B and a heat transfer piece 30 arranged on the battery cell B at a position outside a charge-discharge path. The battery pack may also include a circuit board 20 which includes a lead portion 25 coupled to the heat transfer piece 30 and a main body 21 connected to the lead portion 25 and is configured to acquire temperature information from the battery cell B. The battery pack may further include a temperature sensor T arranged on the lead portion 25 and a coating layer C formed on the temperature sensor T. The coating layer C may include a moisture-proof layer C1 at an inner position relatively close to the temperature sensor T and an anti-shock layer C2 at an outer position relatively distant from the temperature sensor T.

According to an embodiment, the battery pack may include at least one battery cell B. The battery cell B may include a case 10 and an electrode assembly (not shown) accommodated in the case 10. Although not shown in FIGS. 1 to 6C, the electrode assembly may include first and second electrode plates having different polarities, and a separator arranged between the first and second electrode plates. The first and second electrode plates of the electrode assembly may be electrically connected to first and second electrodes E1 and E2 of the battery cell B, respectively. The first and second electrodes E1 and E2 of the battery cell B may be formed on the case 10. The charge-discharge path of the battery cell B may be connected to the electrode assembly (not shown) accommodated in the case 10 through the first and second electrodes E1 and E2 formed on the case 10, and as described later, the first and second electrodes E1 and E2 formed on the case 10 may be electrically connected to other battery cells B through bus bars 50. Throughout the present specification, the charge-discharge path of the battery pack may refer to a path defined through bus bars 50 which electrically connect different battery cells B and the first and second electrodes E1 and E2 and the electrode assemblies of the battery cells B connected to the bus bars 50. The charge-discharge path of the battery pack may also refer to a charge-discharge current path connected to the electrode assemblies of battery cells B arranged between first and second input/output terminals 51 and 52 which are provided at both ends of the charge-discharge path.

The battery cell B or the case 10 of the battery cell B may have a substantially rectangular parallelepiped shape. For example, the battery cell B may include an electrode surface 11 on which the first and second electrodes E1 and E2 are formed and a bottom surface 12 opposite the electrode surface 11. The battery cell B may also include a pair of relatively large main surfaces 13 and a pair of relatively small lateral surfaces 14 which connect the electrode surface 11 and the bottom surface 12 to each other. For example, according to an embodiment, the battery cell B may include a plurality of battery cells B arranged in a first direction Z1, and in this case, the main surfaces 13 of the battery cells B which are adjacent to each other may face each other.

In an embodiment, the electrode surface 11, the bottom surface 12, the main surfaces 13, and the lateral surfaces 14, which form the case 10 of each of the battery cells B, do not form the charge-discharge path. The case 10 forms the exterior of the battery cell B, and thus when charge-discharge current flows through the electrode surface 11, the bottom surface 12, the main surfaces 13, or the lateral surfaces 14 which are exposed to the outside, electrical interference with the external environment or the risk of electrical short circuiting may occur. The first and second electrodes E1 and E2 may be formed on the electrode surface 11. For example, the first and second electrodes E1 and E2 may be coupled to the electrode surface 11 in a state in which the first and second electrodes E1 and E2 are insulated using insulating gaskets (not shown). That is, the first and second electrodes E1 and E2 may form the charge-discharge path electrically connected to the electrode assembly (not shown), but the electrode surface 11 on which the first and second electrodes E1 and E2 are formed may not form the charge-discharge path. As described later, in an embodiment, the heat transfer piece 30 for detecting information about the temperature of the battery cell B may be arranged on the battery cell B at a position outside the charge-discharge path. Furthermore, in an embodiment, the heat transfer piece 30 may be arranged on the case 10 of the battery cell B, specifically on the electrode surface 11 away from the first and second electrodes E1 and E2.

The first and second electrodes E1 and E2 of each of the battery cells B may be arranged in a second direction Z2 crossing the first direction Z1 in which the battery cells B are arranged. In this case, the second direction Z2 in which the first and second electrodes E1 and E2 are arranged may cross the first direction Z1 in which the battery cells B are arranged. For example, in an embodiment, the second direction Z2 may be substantially perpendicular to the first direction Z1. In addition, a vent hole 15 may be formed in each of the battery cells B between the first and second electrodes E1 and E2. When gas generated in the battery cell B is accumulated and has a pressure equal to or greater than a critical pressure (e.g., a threshold pressure), fracture may occur around the vent hole 15 to reduce the internal pressure of the battery cell B.

According to an embodiment, the battery pack may include a plurality of battery cells B. For example, the battery cells B of the battery pack may be electrically connected to each other through bus bars 50. For example, in an embodiment, the battery cells B adjacent to each other may be electrically connected to each other through the bus bars 50. In addition, the first and second input/output terminals 51 and 52 may be respectively connected to battery cells B which are arranged at both end positions among the battery cells B electrically connected to each other. For example, the first and second input/output terminals 51 and 52 may be directly connected to a lowest-potential electrode (one of the first and second electrodes E1 and E2) of the battery cell B arranged on an end of the charge-discharge path of the battery cells B which are electrically connected to each other. The first and second input/output terminals 51 and 52 may also be directly connected to a highest-potential electrode (the other of the first and second electrodes E1 and E2) of the battery cell B arranged on the other end of the charge-discharge path of the battery cells B which are electrically connected to each other. Alternatively, the first and second input/output terminals 51 and 52 may be connected to bus bars 50 connected to the lowest-potential electrode (one of the first and second electrodes E1 and E2) and the highest-potential electrode (the other of the first and second electrodes E1 and E2).

Throughout the present specification, the charge-discharge path of the battery cells B may refer to a path through which charge-discharge current of the battery cells B flows and may form a charge-discharge current path which connect together A plurality of bus bars 50 arranged between the first and second input/output terminals 51 and 52 may be provided at both ends of the charge-discharge path. The first and second electrodes E1 and E2 of each of the battery cells B may be connected to the bus bars 50. The electrode assemblies (not shown) may be connected between the first and second electrodes E1 and E2.

The heat transfer piece 30 may be coupled to at least one of the battery cells B. The heat transfer piece 30 may be arranged on a battery cell B which is a target of which the temperature will be measured, or heat transfer pieces 30 may be respectively arranged on some of the battery cells B arranged in the first direction Z1. That is, in terms of manufacturing costs, the heat transfer pieces 30 may be intermittently arranged in the first direction Z1 on some of the battery cells B rather than arranging a plurality of heat transfer pieces 30 respectively on the battery cells B. For example, the heat transfer pieces 30 may be placed on battery cells B of which the positional orders correspond to multiples of an integer in the first direction Z1. Referring to FIG. 1, in an embodiment, the heat transfer pieces 30 may be arranged on the battery cells B, which are arranged at both ends in the first direction Z1, and a battery cell B, which is arranged at a center position in the first direction Z1.

The heat transfer pieces 30 may be arranged on the battery cells B at positions away from the charge-discharge path. In an embodiment, the heat transfer pieces 30 may be arranged on the cases 10 of the battery cells B. For example, the heat transfer pieces 30 may be arranged on the electrode surfaces 11, the bottom surfaces 12, the main surfaces 13, or the lateral surfaces 14 of the cases 10 of the battery cells B. In an embodiment, the heat transfer pieces 30 may be arranged on the electrode surfaces 11 of the battery cells B. That is, the heat transfer piece 30 may be arranged on the electrode surfaces 11 of the battery cells B at positions away from (e.g., spaced apart from) the charge-discharge path. The heat transfer pieces 30 may sense information about the temperatures of the battery cells B and are thus not required to be electrically coupled to the battery cells B unlike the case of measuring the voltages of the battery cells B. In an embodiment, the heat transfer pieces 30 may be thermally coupled to the battery cells B for sensing information about the temperatures of the battery cells B.

In a comparative example (not necessarily prior art), heat transfer pieces for sensing information about the temperatures of battery cells B may be arranged on the bus bars 50 in contrast to the present disclosure. Since the bus bars 50 are formed on the charge-discharge path through which charge-discharge current flows, it may be difficult to accurately detect the temperatures of the battery cells B due to joule-heating caused by charge-discharge current. That is, in the comparative example, the temperatures of the bus bars 50 through which charge-discharge current intensively flows are measured using the heat transfer pieces arranged on the bus bars 50, and thus it may be difficult to accurately sense the temperatures of the battery cells B. In an embodiment, the temperatures of the battery cells B may be sensitively detected through the heat transfer pieces 30 arranged at positions away the charge-discharge path without being affected by joule-heating occurring due to charge-discharge current.

The heat transfer pieces 30 may be arranged on the cases 10 of the battery cells B away from the charge-discharge path. For example, the heat transfer pieces 30 may be arranged on the bottom surfaces 12, the main surfaces 13, or the lateral surfaces 14 of the cases 10 besides the electrode surfaces 11 of the cases 10. However, in an embodiment, since lead portions 25 extending from the main body 21 of the circuit board 20 are connected to the heat transfer pieces 30, the heat transfer pieces 30 may be arranged on the electrode surfaces 11 of the battery cells B facing the circuit board 20 to decrease connection lengths to the circuit board 20.

In an embodiment, the heat transfer pieces 30 may be provided as metal plates containing nickel or a nickel alloy. Each of the heat transfer pieces 30 may be welded to the case 10 (for example, to the electrode surface 11 of the case 10) which contains a metallic material including aluminum or an aluminum alloy (refer to a weld zone W shown in FIG. 4). Each of the heat transfer pieces 30 may include nickel or a nickel alloy for weldability with the electrode surface 11 of the case 10. In an embodiment, the weld zone W (refer to FIG. 4) between the heat transfer piece 30 and the electrode surface 11 may be formed by laser welding. For example, the weld zone W may be formed as a pair of parallel stripes extending in the first direction Z1.

The circuit board 20 may be arranged on the electrode surfaces 11 of the battery cells B, and the circuit board 20 may include the main body 21 extending across the battery cells B and the lead portions 25 extending from the main body 21. Although not shown in FIGS. 1 to 6C, the circuit board 20 may include a conductive pattern (not shown) through which a relatively large amount of current such as charge-discharge current does not flow but a relatively small amount of current such as sensor signals (for example, signals of temperature sensors T) flows. The circuit board 20 may also include an insulating film (not shown) which insulates the conductive pattern (not shown). The circuit board 20 may be formed in the form of a film as a whole, that is, in the form of a flexible circuit board. In an embodiment, the circuit board 20 may obtain information about the temperatures of the battery cells B. To this end, the circuit board 20 may be electrically connected to temperature sensors T through the conductive pattern (not shown), and the conductive pattern (not shown) may be insulated by the insulating film (not shown) arranged on the conductive pattern (not shown).

The lead portions 25 extending from the main body 21 of the circuit board 20 may be connected to the heat transfer pieces 30. That is, the heat transfer pieces 30 and the lead portions 25 may be sequentially arranged on the electrode surfaces 11 of the battery cells B. For example, each of the heat transfer pieces 30 may include a first coupling portion 31 which is coupled to the case 10 (for example, the electrode surface 11 of the case 10) of the battery cell B Each of the heat transfer pieces 30 may also include a second coupling portion 32 which is coupled to the lead portion 25 of the circuit board 20. The first and second coupling portions 31 and 32 may be formed at positions that do not overlap each other. For example, the first and second coupling portions 31 and 32 may be arranged in the second direction Z2 crossing the first direction Z1 in which the battery cells B are arranged. In an embodiment, the lead portion 25 may be soldered to the second coupling portion 32 of the heat transfer piece 30 (refer to a solder zone S shown in FIG. 4). In an embodiment, the first coupling portion 31 of the heat transfer piece 30 and the case 10 (the electrode surface 11 of the case 10) of the battery cell B may form the weld zone W (refer to FIG. 4). Furthermore, the second coupling portion 32 of the heat transfer piece 30 and the lead portion 25 of the circuit board 20 may form the solder zone S (refer to FIG. 4).

The temperature sensor T may be arranged on the lead portion 25. The temperature sensor T may be a thermistor such as a positive temperature coefficient (PTC) thermistor or a negative temperature coefficient (NTC) thermistor which is configured to measure a temperature based on a temperature-dependent increase or decrease in resistance. The temperature sensor T may be soldered to the lead portion 25 and may be provided as a chip-type thermistor configured to be directly mounted on the lead portion 25 by soldering. Sensor signals of the temperature sensor T may be transmitted to the main body 21 of the circuit board 20 through the lead portion 25. In an embodiment, sensor signals of the temperature sensor T may be transmitted to a battery management system (BMS, not shown) through an end portion CN (refer to FIG. 1) in the first direction Z1 in which the main body 21 of the circuit board 20 extends.

In an embodiment, the temperature sensor T is arranged on the lead portion 25. For example, the temperature sensor T may be arranged on a surface of the lead portion 25 which is opposite the battery cell B among both surfaces of the lead portion 25, that is, among a surface facing the battery cell B and a surface opposite the battery cell B. In other words, according to an embodiment, the heat transfer piece 30, the lead portion 25, and the temperature sensor T may be sequentially arranged on the electrode surface 11 of the battery cell B. Furthermore, the temperature sensor T may sense the temperature of the battery cell B from the electrode surface 11 of the battery cell B through the heat transfer piece 30 and the lead portion 25.

In a comparative example (not necessarily prior art), a temperature sensor may be arranged to face the battery cell B in contrast to the present disclosure. That is, the temperature sensor may be arranged on the surface of the lead portion 25 which faces the battery cell B. In the comparative example, the temperature sensor faces the electrode surface 11 of the battery cell B or the heat transfer piece 30 provided on the electrode surface 11, and thus it is structurally difficult to protect the temperature sensor T from external harmful components or external shocks. As described below, in an embodiment, since the temperature sensor T is exposed from the surface of the lead portion 25 which is opposite the battery cell B, the moisture-proof layer C1 for blocking the penetration of external harmful substances onto the temperature sensor T and the anti-shock layer C2 for absorbing external shocks may be formed on the temperature sensor T, and a structure for reliably protecting the temperature sensor T may be provided.

In the comparative example, the temperature sensor is arranged on the surface of the lead portion 25 facing the battery cell B among both surfaces of the lead portion 25 such that the temperature sensor may sense the temperature of the temperature of the battery cell B without involving the lead portion 25 However, in an embodiment, the lead portion 25 has a small thickness as part of the circuit board 20 provided in the form of a film and is provided with a metal pattern such that even when the temperature sensor T senses the temperature of the battery cell B through the lead portion 25, the temperature sensor T may sensitively detect the temperature of the battery cell B.

The lead portion 25 may extend from the main body 21 of the circuit board 20 and may be connected to the heat transfer piece 30. For example, the lead portion 25 may include an end 25a connected to the main body 21, another end 25b connected to the heat transfer piece 30, and a bent portion 25c between the end 25a and the other end 25b. The bent portion 25c may impart flexibility to the connection length of the lead portion 25 between the heat transfer piece 30 and the main body 21. Since the bent portion 25c impart flexibility to the connection length in the first direction Z1, it is possible to absorb the positional movement of the battery cell B in the first direction Z1 caused by swelling of the battery cell B and prevent the lead portion 25 from being damaged by, for example, variations in the connection length between the heat transfer piece 30 and the main body 21. For example, the bent portion 25c may have a bent shape of which at least portions overlap each other in the second direction Z2 crossing the first direction Z1 to impart flexibility to the connection length in the first direction Z1.

Referring to FIGS. 4 and 5, the moisture-proof layer C1 and the anti-shock layer C2 may be sequentially formed on the temperature sensor T. The moisture-proof layer C1 and the anti-shock layer C2 may surround the temperature sensor T at a side opposite the battery cell B. For example, the moisture-proof layer C1 may be formed on the temperature sensor T to cover the temperature sensor T, and the anti-shock layer C2 may be formed on the moisture-proof layer C1 to cover the moisture-proof layer C1.

In an embodiment, the moisture-proof layer C1 and the anti-shock layer C2 may respectively include a relatively hard material and a relatively soft material, and a discontinuous interface C3 between different materials may be formed between the moisture-proof layer C1 and the anti-shock layer C2. Furthermore, in an embodiment, the moisture-proof layer C1 and the anti-shock layer C2 may be formed respectively at an inner position relatively close to the temperature sensor T and an outer position relatively distant from the temperature sensor T.

Hereinafter, the moisture-proof layer C1 and the anti-shock layer C2 will be described. The moisture-proof layer C1 may block the penetration of external harmful substances and may thus include a hard material having a relatively dense texture. The moisture-proof layer C1 may have a sufficient thickness t1 to sufficiently block the penetration of external harmful substances. For example, the anti-shock layer C2 may have a sufficient thickness t2 to absorb external shocks.

The moisture-proof layer C1 and the anti-shock layer C2 formed on the temperature sensor T may protect the temperature sensor T. The moisture-proof layer C1 and the anti-shock layer C2 may not transfer heat to the temperature sensor T and may not insulate heat retention to maintain heat transferred to the temperature sensor T. In some embodiments, the moisture-proof layer C1 and the anti-shock layer C2 are formed on the temperature sensor T at a side opposite to the battery cell B and does not participate in heat transfer from the battery cell B such that the moisture-proof layer C1 and the anti-shock layer C2 may not disturb heat transfer from the battery cell B. Thus, materials for the moisture-proof layer C1 and the anti-shock layer C2 may be selected without considering thermal properties.

In an embodiment, two layers including different materials, that is, the moisture-proof layer C1 and the anti-shock layer C2, may be sequentially formed on the temperature sensor T. In an embodiment, the moisture-proof layer C1 including a relatively hard material may be formed at an inner position relatively close to the temperature sensor T. Furthermore, the anti-shock layer C2 including a relatively soft material may be formed at an outer position relatively distant from the temperature sensor T. As described above, the moisture-proof layer C1 and the anti-shock layer C2 may be formed respectively at inner and outer positions according to the characteristics of the materials of the moisture-proof layer C1 and the anti-shock layer C2. Thus, the penetration of external harmful substances may be effectively blocked at the discontinuous interface C3 formed by the moisture-proof layer C1 and the anti-shock layer C2, and external shocks may be effectively absorbed before being transmitted to the internal temperature sensor T.

Referring to FIG. 1, the main body 21 of the circuit board 20 may extend across the battery cells B in the first direction Z1 in which the battery cells B are arranged, for example, across center regions of the electrode surfaces 11 of the battery cells B. In this case, openings 20' may be formed in portions of the main body 21 of the circuit board 20 and may be arranged in the first direction Z1 so as not to block the vent holes 15 of the battery cells B, and the other portions of the main body 21 may be formed as two branches so as not to block the vent holes 15 of the battery cells B.

In an embodiment, a bus bar holder H may be arranged between the battery cells B and the circuit board 20. The bus bars 50 for electrically connecting the battery cells B, and the circuit board 20 may be placed on the bus bar holder H, and the bus bar holder H may define the assembly positions of the bus bars 50 and the circuit board 20. In an embodiment, along both sides of the bus bar holder H in the second direction Z2, rows of different bus bars 50 may be arranged, and at a center position of the bus bar holder H in the second direction Z2, the circuit board 20 may be arranged. A plurality of openings V may be formed in the bus bar holder H and may be arranged in the first direction Z1 so as not to block the vent holes 15 of the battery cells B. In addition, through-holes H' may be formed in the bus bar holder H to expose the heat transfer pieces 30, which are connected to the circuit board 20 arranged on the bus bar holder H, from the electrode surfaces 11 of the battery cells B. The heat transfer pieces 30 exposed through the through-holes H' may be coupled to the electrode surfaces 11 of the battery cells B.

As described above, according to the one or more of the above embodiments, the battery pack which is configured to accurately detect the temperatures of the battery cells B and has a temperature sensing structure improved for reliably protecting the temperature sensors TS.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims.

What is claimed is:

1. A battery pack comprising:
at least one battery cell including a case and an electrode assembly accommodated in the case, the case comprising an electrode surface, the at least one battery cell arranged in a first direction;
at least one electrode formed on the electrode surface;
a heat transfer piece spaced apart from a charge-discharge path including the at least one electrode, the heat transfer piece not vertically overlapping the at least one electrode, the heat transfer piece thermally coupled to the at least one battery cell and the heat transfer piece comprising a first coupling portion coupled to the electrode surface of the case and a second coupling portion;
a circuit board comprising a lead portion coupled to the heat transfer piece and a main body directly connected to and integrally formed with the lead portion, the lead portion of the circuit board coupled to the second coupling portion of the heat transfer piece, the lead portion comprising a flat portion and a U-shaped portion connecting the main body to the flat portion, the flat portion being parallel to both the electrode surface of the case and the main body of the circuit board, and the flat portion and the U-shaped portion arranged in a second direction crossing the first direction;
a temperature sensor arranged directly on the flat portion of the lead portion and configured to generate a temperature sensor signal by sensing a temperature of the at least one battery cell through the first coupling portion and the second coupling portion of the heat transfer piece and the lead portion of the circuit board such that the temperature of the at least one battery cell is detected without being affected by joule-heating occurring due to charge-discharge current of the charge-discharge path, the temperature sensor further configured to transmit the generated temperature sensor signal to the lead portion of the circuit board, the main body of the circuit board being configured to receive the temperature sensor signal from the lead portion;
a moisture-proof layer covering the temperature sensor and configured to block penetration of external substances onto the temperature sensor; and
an anti-shock layer provided directly on the moisture-proof layer and configured to absorb external shock.

2. The battery pack of claim 1, wherein the circuit board is arranged to face the electrode surface of the at least one battery cell.

3. The battery pack of claim 1, wherein the circuit board comprises a flexible circuit board, the flexible circuit board comprising a conductive pattern which is connected to the temperature sensor and an insulating film which insulates the conductive pattern.

4. The battery pack of claim 1, wherein:
the first and second coupling portions are provided at positions that do not overlap each other.

5. The battery pack of claim 4, wherein:
the at least one battery cell comprises a plurality of battery cells arranged in the first direction, and
the first and second coupling portions are arranged in the second direction crossing the first direction.

6. The battery pack of claim 4, wherein the heat transfer piece and the lead portion are sequentially arranged on the at least one battery cell.

7. The battery pack of claim 1, wherein:
the first coupling portion comprises a weld zone between the heat transfer piece and the at least one battery cell, and
the second coupling portion comprises a solder zone between the heat transfer piece and the lead portion of the circuit board.

8. The battery pack of claim 1, wherein the heat transfer piece comprises a metal plate comprising nickel or a nickel alloy.

9. The battery pack of claim 1, wherein the lead portion has a surface facing the at least one battery cell and a surface opposite the battery cell, and wherein the temperature sensor is arranged on the surface opposite the battery cell.

10. The battery pack of claim 9, wherein:
the heat transfer piece, the lead portion, and the temperature sensor are sequentially arranged on the at least one battery cell.

11. The battery pack of claim 1, wherein:
the U-shaped portion is bent such that at least portions of the bent U-shaped portion overlap each other in the second direction connecting the two electrodes and crossing the first direction so as to impart flexibility to the lead portion in the first direction between the heat transfer piece and the main body.

12. The battery pack of claim 1, wherein the moisture-proof layer and the anti-shock layer surround the temperature sensor at a side opposite the at least one battery cell.

13. The battery pack of claim 1, wherein the moisture-proof layer is formed of a first material and the anti-shock layer is formed of a second material that is softer than the first material.

14. The battery pack of claim 1, wherein a discontinuous interface between different materials is formed between the moisture-proof layer and the anti-shock layer.

15. The battery pack of claim 1, wherein the moisture-proof layer and the anti-shock layer are respectively provided at an inner position and an outer position, and wherein the inner position is closer to the temperature sensor than the outer position.

16. The battery pack of claim 1, wherein:
the at least one battery cell comprises a plurality of battery cells arranged in the first direction, and
openings are formed in portions of the main body of the circuit board and are arranged in the first direction so as not to block vent holes of the plurality of battery cells, and other portions of the main body are formed as two branches so as not to block the vent holes of the plurality of battery cells.

17. The battery pack of claim 1, wherein the at least one electrode comprises first and second electrodes spaced apart from each other, and wherein the heat transfer piece is disposed between first the and second electrodes.

18. The battery pack of claim 1, wherein the heat transfer piece is disposed in a same layer as the at least one electrode.

19. The battery pack of claim 1, further comprising:
at least one weld zone coupling the heat transfer piece to the electrode surface of the case, the at least one weld zone protruding from a bottom of the first coupling portion of the heat transfer piece,
wherein the temperature sensor directly vertically overlaps the lead portion of the circuit board and the second coupling portion of the heat transfer piece,
wherein the main body of the circuit board is vertically spaced apart from the electrode surface of the case, and
wherein the lead portion of the circuit board is configured to absorb positional movement of the at least one battery cell with respect to the main body of the circuit board in both a vertical direction and a horizontal direction.

20. The battery pack of claim 1, wherein the flat portion is coupled to the U-shaped portion via a vertical step such that the flat portion is closer to the heat transfer piece than at least part of the U-shaped portion.

* * * * *